(12) United States Patent
Redivo et al.

(10) Patent No.: US 12,552,060 B2
(45) Date of Patent: Feb. 17, 2026

(54) REFINED DEVICE FOR CUTTING TAPES

(71) Applicant: RED.PAS S.R.L.S., Pordenone (IT)

(72) Inventors: Loris Redivo, Roveredo in Piano (IT); Claudio Paschini, Roveredo in Piano (IT)

(73) Assignee: RED.PAS S.R.L.S., Pordenone (IT)

( * ) Notice: Subject to any disclaimer, the term of this patent is extended or adjusted under 35 U.S.C. 154(b) by 241 days.

(21) Appl. No.: 18/270,817

(22) PCT Filed: Dec. 14, 2021

(86) PCT No.: PCT/IB2021/061701
§ 371 (c)(1),
(2) Date: Jul. 3, 2023

(87) PCT Pub. No.: WO2022/149026
PCT Pub. Date: Jul. 14, 2022

(65) Prior Publication Data
US 2024/0066738 A1    Feb. 29, 2024

(30) Foreign Application Priority Data

Jan. 7, 2021    (IT) .......................... 102021000000233

(51) Int. Cl.
*B26D 1/03* (2006.01)
*B26D 5/10* (2006.01)
*B26D 7/00* (2006.01)

(52) U.S. Cl.
CPC ............... *B26D 1/035* (2013.01); *B26D 5/10* (2013.01); *B26D 7/0006* (2013.01)

(58) Field of Classification Search
CPC .......... B26D 1/035; B26D 1/455; B26D 5/10; B26D 7/0006
USPC ................. 83/13, 56, 440; 30/287, 289, 304
See application file for complete search history.

(56) References Cited

U.S. PATENT DOCUMENTS

| | | | |
|---|---|---|---|
| 4,228,707 A | 10/1980 | Arlett | |
| 2012/0167731 A1* | 7/2012 | Darby | ................... B26D 1/035 83/56 |
| 2019/0144231 A1* | 5/2019 | Redivo | ............... B26D 7/0006 83/549 |

FOREIGN PATENT DOCUMENTS

| | | |
|---|---|---|
| IT | UB20159440 A1 | 6/2017 |
| WO | 2017/195141 A1 | 11/2017 |

OTHER PUBLICATIONS

Mar. 4, 2022 International Search Report issued in International Patent Application No. PCT/IB2021/061701.
Mar. 4, 2022 Written Opinion of the International Searching Authority issued in International Patent Application No. PCT/IB2021/061701.

* cited by examiner

*Primary Examiner* — Adam J Eiseman
*Assistant Examiner* — Robert D Cornett
(74) *Attorney, Agent, or Firm* — Oliff PLC

(57) ABSTRACT

An improved device for cutting tapes and, in particular, to a device for multiple cutting of adhesive reinforced tapes to be used in the rehabilitation field. Furthermore, the device is advantageously practical and versatile to satisfy any requirement that may arise when using the adhesive tape.

13 Claims, 14 Drawing Sheets

REFINED DEVICE FOR CUTTING TAPES

TECHNICAL FIELD OF THE INVENTION

The present invention refers to an improved device for cutting tapes and, in particular, to a device for multiple cutting of adhesive tapes to be used in the rehabilitation field. Furthermore, the device is advantageously practical and versatile to satisfy any requirement that may arise when using the adhesive tape.

BACKGROUND ART

The use of tapes has nowadays become very widespread thanks to the numerous potentialities of use, especially of reinforced tapes. In fact, tape is widely used for example in the packaging sector, decoration, in the construction sector, in the repair of objects such as plastic parts, wood, pipes with leaks. Furthermore, according to the structure and weft of the tape, the use can be further diversified according to the needs of greater or lesser strength due to reinforcements such as canvas, resistance to atmospheric agents with plastic covers, elasticity, seal on the surface on which is applied with special glues.

A specific filed of the technique in which the reinforced tapes are widely used is represented by physiotherapy and rehabilitation in general. At the end of the seventies, a technique called "Kinesio taping method" was developed, according to which elastic-reinforced tapes are applied to certain areas of the human body in order to assist in the treatment of muscle, tendon and joint trauma, or in rehabilitation following these traumas. Also through the use of the aforementioned elastic taping, other methods of use have been developed that are well suited to the physiological mechanisms of the organism, allowing to extend its use also in the phlebological, circulatory and neurological fields, providing effective support in drainage of hematomas, in the pre and post surgical preparation, in the improvement of scar tissues, aid of venous stasis, and assisted in the therapeutic plans of neurological pathologies.

Elastic tapes or taping for use in rehabilitation are made up of an partially elastic fabric, provided with an application side covered with adhesive to allow their application on the human or animal body. Therefore, depending on the parts of the body involved in the treatment to be performed, as well as according to specific methods and techniques, a multiplicity of tapes having well-defined dimensions and shapes is required. But the tapes are generally available in the form of rolls of predetermined width and the operator is forced to cut the tape according to a length and a width each time dictated by the type of treatment and body area concerned. Furthermore, these operations must be repeated several times when the type of application requires various strips or portions to be used. It should also be kept in mind that making longitudinal cuts with scissors is rather slow and imprecise because it must be done by hand.

Especially in uses for athletes, the elastic tapes have a strong structure, but elastically flexible and resistant to traction. Consequently, this type of tape cannot be easily cut into portions and requires very sharp scissors. Therefore, there is a risk of cutting yourself when preparing the tapes. In addition, if the cut is not done well, the tape can present unpleasant fraying for the wearer and, in any case, have points of weakening of the weft that can extend onto other parts of the tape, affecting the mechanical resistance and correct functioning.

Alternatively, pre-cut tapes of different sizes exist on the market so as to provide the operator with a range of tapes without the aforementioned drawbacks. Although these tapes are practical, they force the operator to stock up on large quantities of tape. Furthermore, the production of different tape sizes considerably complicates the production processes and considerably increases the volume of packaging, as well as storage. In addition, a considerable amount of waste is produced due to the personalization of the tape and the size of the limbs and body parts of the individual patient/user. Everything obviously translates into high material consumption and production costs, especially when compared to the product itself. Last but not least, a pre-cut tape satisfies only some standard conditions, but it cannot adapt to all the variables of the human body.

Similar problems are also encountered for simple tapes or for reinforced tapes used in different sectors such as those exemplified above. In fact, even for example to repair, there may be a need to cut a strip in the longitudinal direction in order to obtain a plurality of uniform strips to be applied to the object to be repaired. The use of sharp scissors or the use of pre-cut tapes entail the same drawbacks noted with the elastic tapes for medical use described above.

To solve the aforementioned problems, the European patent EP3454799 describes a device comprising a first half-shell and a second half-shell designed to delimit an internal cavity equipped with an inlet and an outlet through which an adhesive tape slides along the longitudinal axis of the device. In particular, the first half-shell comprises commands for activating one or more cutting blades of an adhesive tape and the second half-shell on the other hand comprises a plurality of guides for said cutting blades when activated by said commands. The blades are obtained from a single plate sheared in various areas to obtain a plurality of blades, or they are mounted/incorporated integrally on single buttons that can be controlled from the first shell by means of pressure to be exerted to overcome the elastic force of a pair of springs designed to keep the blades away from the sliding surface of the tape when not activated.

Although the aforesaid device solves the problems complained previously, it is not free from some drawbacks. In particular, in the case of use of a single blank plate to form the blades, their wear can easily occur in a differentiated manner according to the greater use of a multiple or single cut of the strip. Consequently, the replacement of one or only some of the blades causes the replacement of the entire plate, i.e. also of the blades that are not very worn. It is evident that a lot of material is wasted. In the case of the use of single buttons carrying the blades, their structure appears complex in that they require a main body which passes through the first shell, protruding with an activation surface and a portion below the first shell carrying the blades. Furthermore, the underlying portion engages with the aforementioned pair of abutment springs.

SUMMARY OF THE INVENTION

The technical problem of the present invention is to devise a device for cutting strips that is able to cut portions of desired length and width at the required moment, avoiding contact with cutting parts and making substantially free net cuts without imperfections. Furthermore, the device must not be constructively complex and with components that are difficult to replace in the event of wear or waste.

This problem is solved by a device provided with a simple but effective construction in which the cutting of the strip can be carried out in various sizes in a safe and highly precise manner.

A first object of the present invention is therefore a versatile tape cutting device capable of cutting tapes in different sizes and with multiple simultaneous cuts.

A second object is to provide a safe device to handle.

A third object is a portable device which can be used in various contexts and is preferably of the pocket type.

A further object is a device that is structurally simple to construct and with blades that can be easily and individually replaced following wear.

BRIEF DESCRIPTION OF THE FIGURES

Further characteristics and advantages of the device for cutting strips of the invention will become more evident from the following description of an embodiment given purely by way of non-limiting example with reference to the following figures, in which.

DETAILED DESCRIPTION OF THE INVENTION

The idea behind the present invention is being able to obtain, with simple and rapid gestures, a plurality of strips of the same width, and preferably length, starting from a single tape in a very precise and automatic way. On the basis of this idea, a device was designed in a way that a reinforced tape could slide herein and in which a plurality of independent blades were housed, easily controlled and easy to replace in case of wear, to create said plurality of strips.

Figure 1:
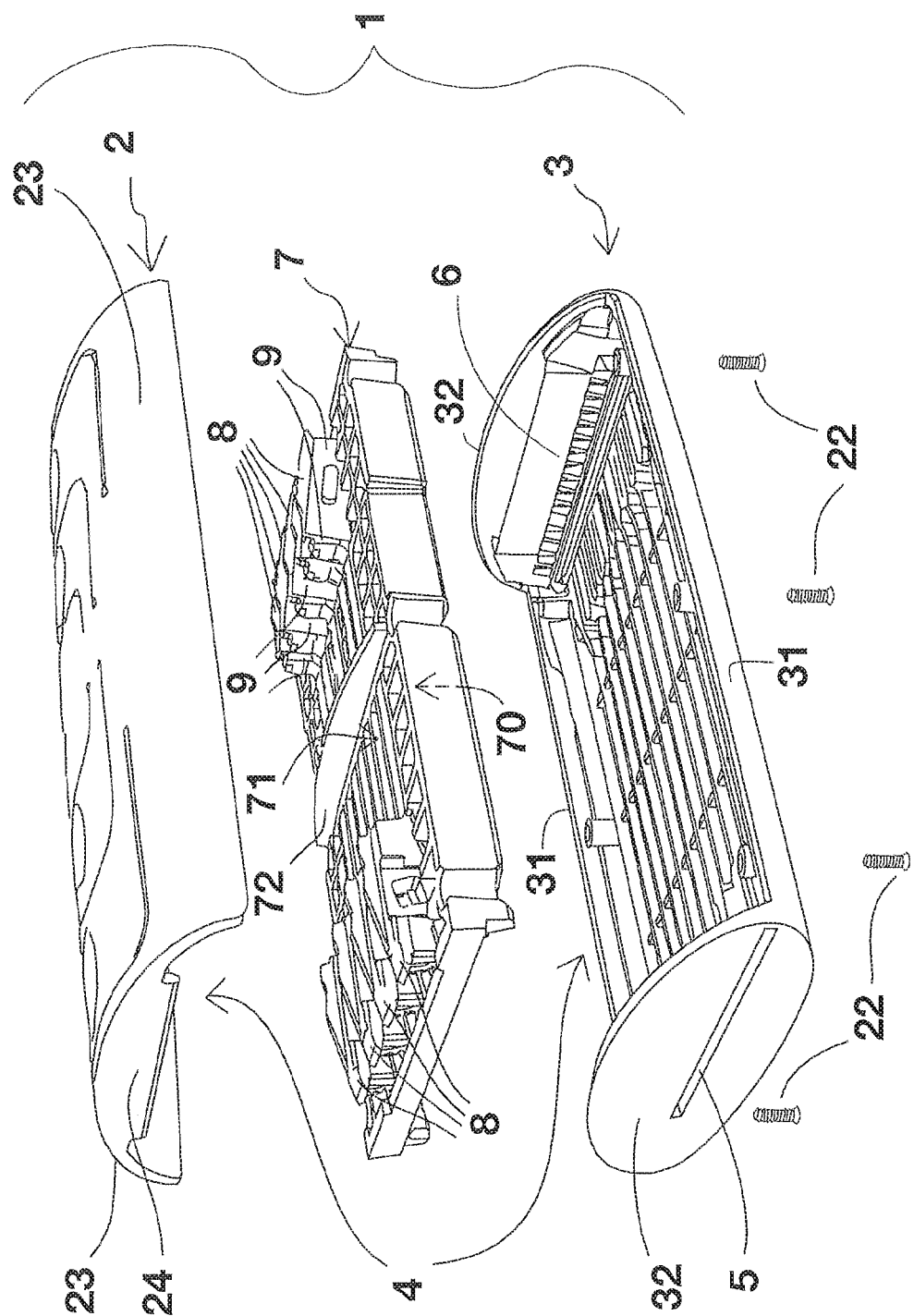
FIG. 1 is a partial exploded perspective view of the device of the invention.
Figure 2:
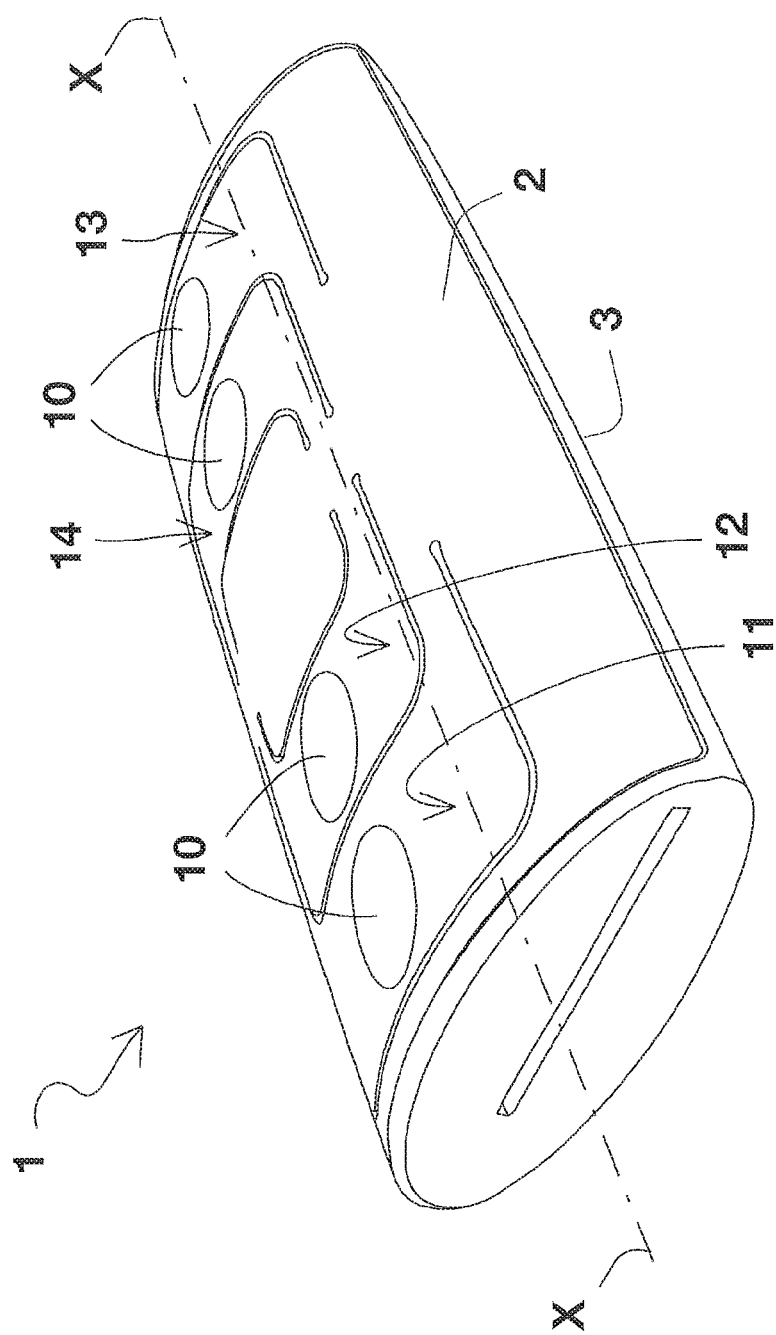
FIG. 2 is a top perspective view of the assembled device of FIG. 1.

As shown in FIG. 1, the reference number 1 indicates a device for cutting strips as a whole. The device 1 comprises a first half-shell 2 and a second half-shell 3 designed to delimit an internal cavity 4, the cavity being equipped with a first opening 5 and a second opening 6 opposite on a rectilinear axis X-X (FIG. 2) of extension of the device, so as to allow the sliding and cutting of a tape. Furthermore, it comprises a support 7 for a plurality of arms 8 carrying blades 9.

In particular, the first half-shell 2 comprises commands 10 (FIGS. 2 and 3) for activating one or more blades 9 for cutting a tape. Preferably, said commands 10 in turn comprise portions 11, 12, 13, 14 of the first half-shell 2 elastically flexing towards the inside of the cavity 4 so as to selectively operate one or more cutting blades 9. These portions 11, 12, 13, 14 can be obtained by partially cutting the first half-shell 2 so as to create a plurality of elastically flexing tabs. The tabs or portions are therefore lying on a single plane which defines the external surface of the first half-shell 2, when not activated (FIG. 3).

Figure 3:
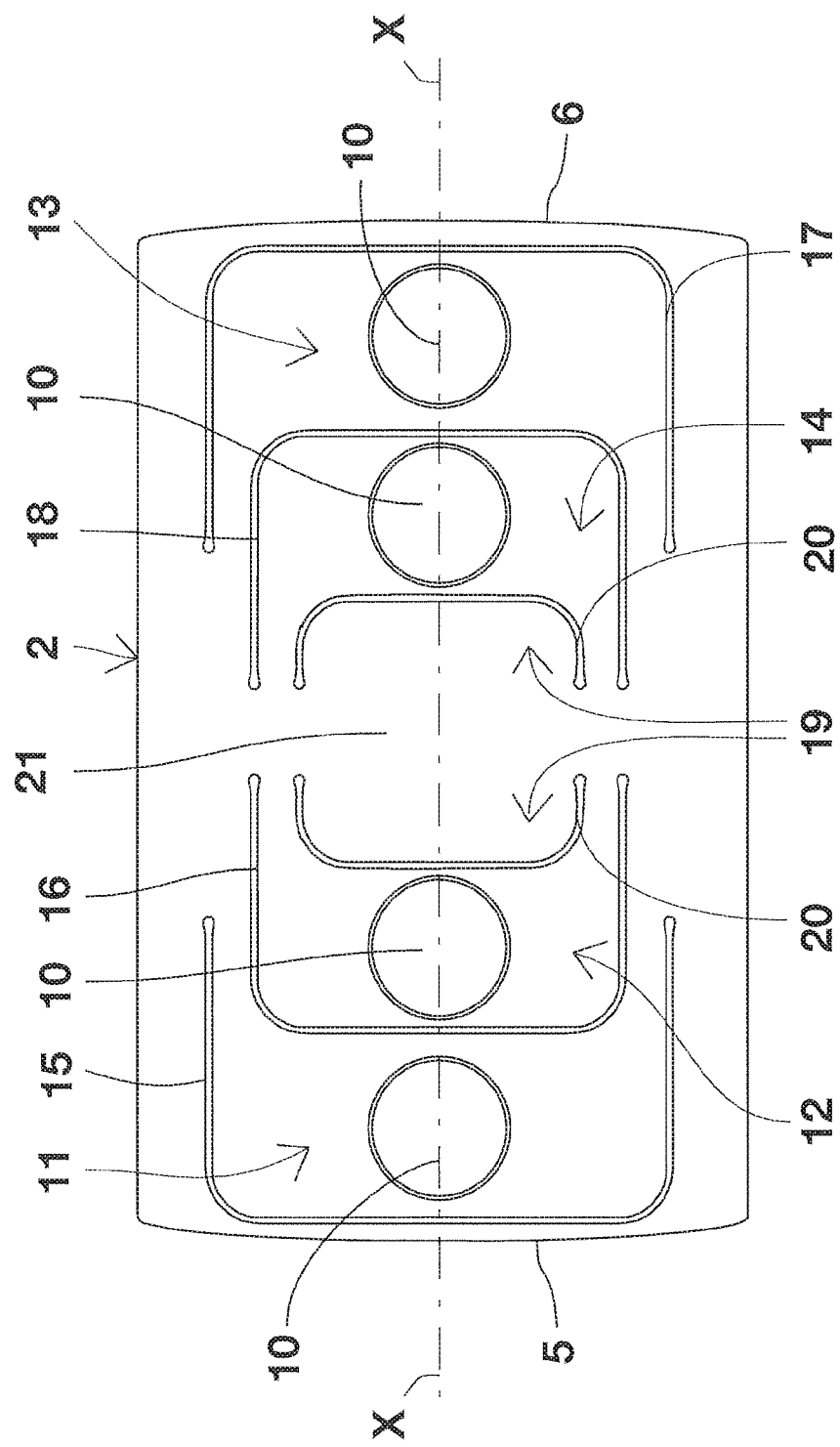
FIG. 3 is a plan view of the exterior of a first shell of the device of FIG. 1.

Preferably, the portions or tabs differ in a first 11, second 12, third 13 and fourth 14 portion (FIG. 3). The first portion 11 is obtained near the first opening 5 of the cavity 4 by means of a first C-shaped cut 15 of the first half-shell 2, with the C open towards the second opening 6. The second portion 12 is defined by a second C-shaped cut 16 which it is aligned with the first C cut 15 and positioned so as to lie partly within the space defined by said first cut, always with the C open towards said second opening 6. The third portion 13 is obtained in proximity to the second opening 6 of the cavity 4 by means of a third C-shaped cut 17 of the first half-shell 2, with the C open towards the first opening 5. The fourth portion 14 is defined by a fourth C-shaped cut 18 which is aligned with the third cut 17 and positioned so as to lie partly inside the space defined by said third cut, always with the C open towards said first opening.

Preferably, two fifth portions 19 are each obtained inside the respective second 12 and fourth 14 C shaped portion and are defined by corresponding fifth C-shaped cuts 20. The opening of the respective C then faces, thus defining a central portion 21 of the first shell 2 which portion extends uninterruptedly transversely to the straight axis X-X.

In this way, it is clear that the first 11 and second 12 portions flex towards the first opening 5, while the third 13 and fourth 14 portions flex towards the second opening 6. Preferably, all the aforementioned cuts of the shell that delimit the portions, they are in the shape of a square C.

Furthermore, the commands 10 can be identified by a slightly depressed area and/or comprising a numerical indicator (FIG. 10) to indicate the number of strips obtainable.

The first half-shell 2 can then comprise interlocking elements (not shown) arranged along its perimeter edge so as to collaborate with corresponding interlocking elements obtained on the perimeter edge of the second half shell 3. These elements are entirely conventional and will not be detailed here. Alternatively, the inner face of the first half-shell can comprise seats 27 (FIG. 4) for receiving conventional screws 22 (FIG. 1) for fixing said first and second half-shells.

Preferably, the perimeter edge of the first half-shell 2 has two lateral, longitudinal and arcuate sides 23, and two straight transverse sides 24 (FIG. 4), one in correspondence with each of said first 5 and second 6 openings.

Figure 4:
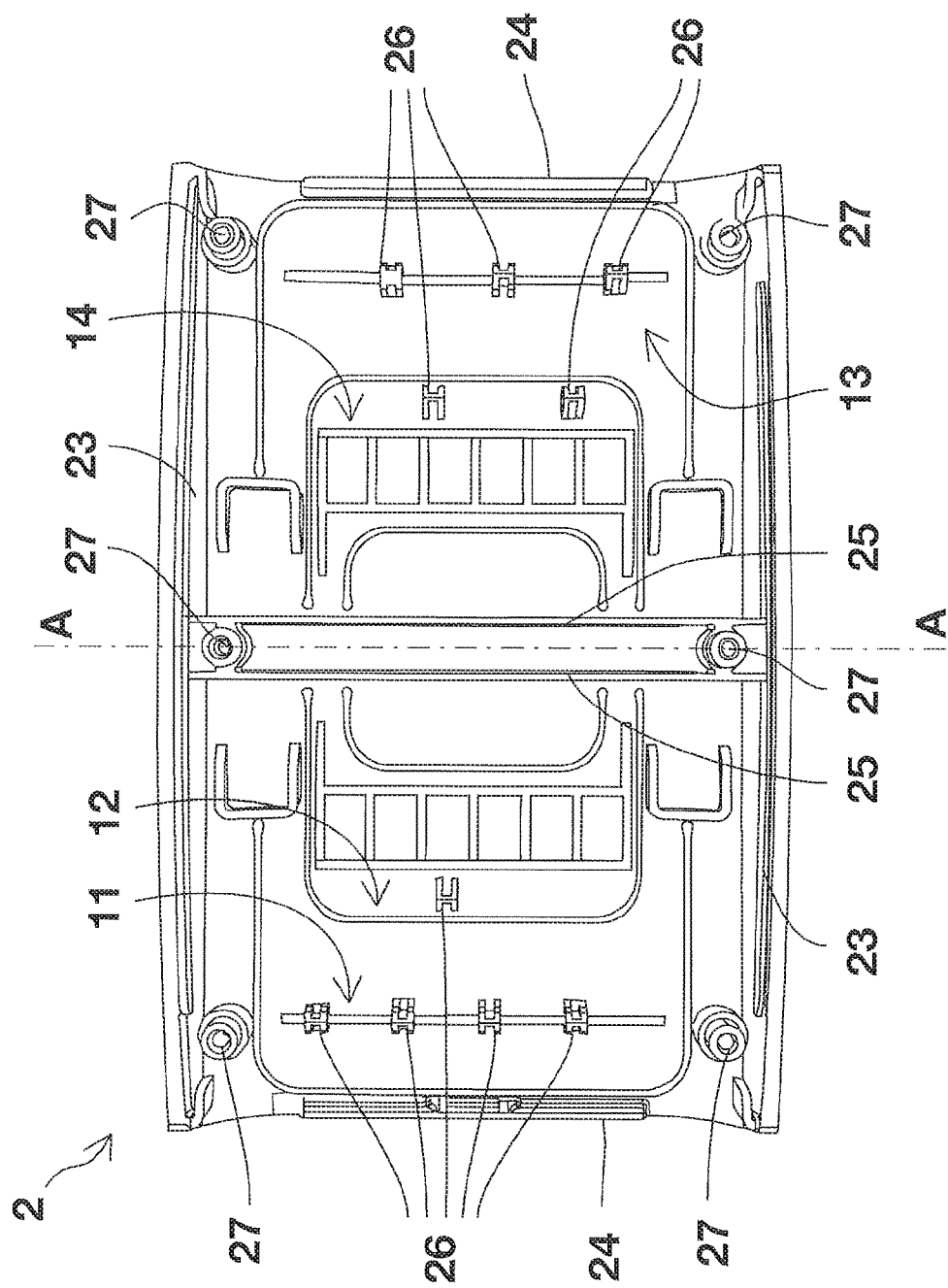
FIG. 4 represents a perspective view of the internal face of the first shell of FIG. 3.

With reference to FIG. 4, the internal face of the first half-shell 2 shows two transverse and parallel ribs 25 obtained astride the transverse axis A-A which divides said face into two equal portions. These ribs extend substantially over the entire width of the first half-shell. These ribs advantageously constrain the arms 8 in the operative position, as explained below.

At each external control 10 of the half-shell 2, fingers 26 for actuating the blades 9 protrude from the internal face, as explained below. In particular, the number of fingers 26 per command corresponds to the number imprinted on the command itself decreased by one unit. In practice, if the number 2 is indicated on the command, its corresponding internal face comprises a single finger 26 for operating a single blade 9 to cut a tape into two portions. Preferably, there will be a command for a one-finger portion, a command for a two-finger portion, a command for a three-finger portion and a command for a four-finger portion. In accordance with the embodiment shown in the figures, the fourth portion 14 of the half-shell 2 comprises a single finger 26, the second portion 12 includes two fingers 26, the first portion 11 includes three fingers 26 and the third portion 13 includes four fingers 26.

Figure 5:
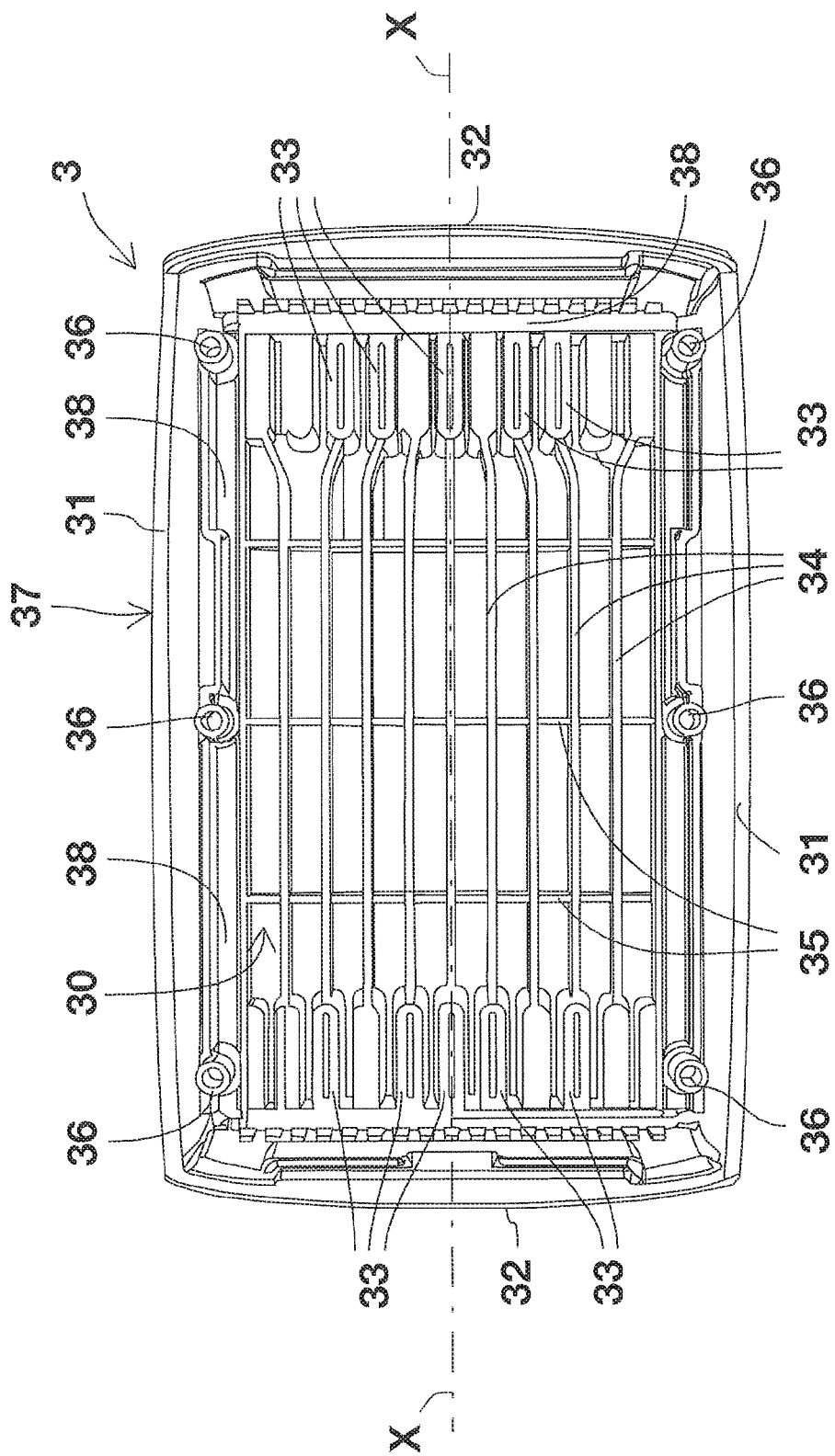
FIG. 5 is a plan view of the interior of a second shell of the device of FIG. 1.

The second half-shell 3, as shown in FIGS. 1 and 5, has a bottom 30 delimited by two rectilinear lateral sides 31 which are connected with corresponding transverse arched sides 32. Preferably, each of the transverse sides 32 comprises a window which constitutes the first 5 and the second 6 openings of the device 1.

As can be seen, the bottom 30 comprises a plurality of perforated projections 33, elongated parallel to each other in the direction of the X-X axis of the device 1. Preferably, the projections are positioned in proximity to each of the two transverse sides 32. In particular, these protrusions constitute a support plane for the tape in the area in which it is subjected to cut. Advantageously, the holes of the protrusions are such as to receive the edge of the blade 9 to size; this was made to have the width of the hole transversal to the X-X axis smaller than the thickness of the tape. Consequently, when the blades are pressed on the tape to cut it, the tape itself does not tend to bend in said holes. If this were the case, the cut would not be clean but with stretching and fraying of the material that makes up the tape, especially in the case of canvas, elasticized and glued tapes. In addition, the holes partly also act as a kind of guide for the blades 9.

It should be noted that the bottom 30 preferably comprises a plurality of longitudinal 34 ribs and/or 35 transverse ribs suitable for cooperating with the aforementioned protrusions 33 in forming a sort of plane on which the tape slides in the cavity 4 defined by the two first 2 and second 3 half-shells. In addition, the ribs also act as reinforcements of the bottom without weighing down the structure. The bottom can also be provided with engagement seats 36 for corresponding screws 22 for fixing the two half-shells, as explained above. Alternatively or in combination, the sides of the second half-shell 3 can be equipped with interlocking elements which cooperate with the aforesaid interlocking elements of the first shell 2.

Advantageously, the bottom 30 can have through holes (not shown) in correspondence with said protrusions 33 to allow the release of any residual material of the tape when cut so as not to cause clogging and, therefore, not to affect the functionality of the device.

Close to the perimeter edge 37 of the second shell 3 there is a shaped channel 38 adapted to receive a shaped perimeter edge protruding from the first face of the support 7. In this way, the support 7 rests on the second shell in a correct manner.

Figure 6:
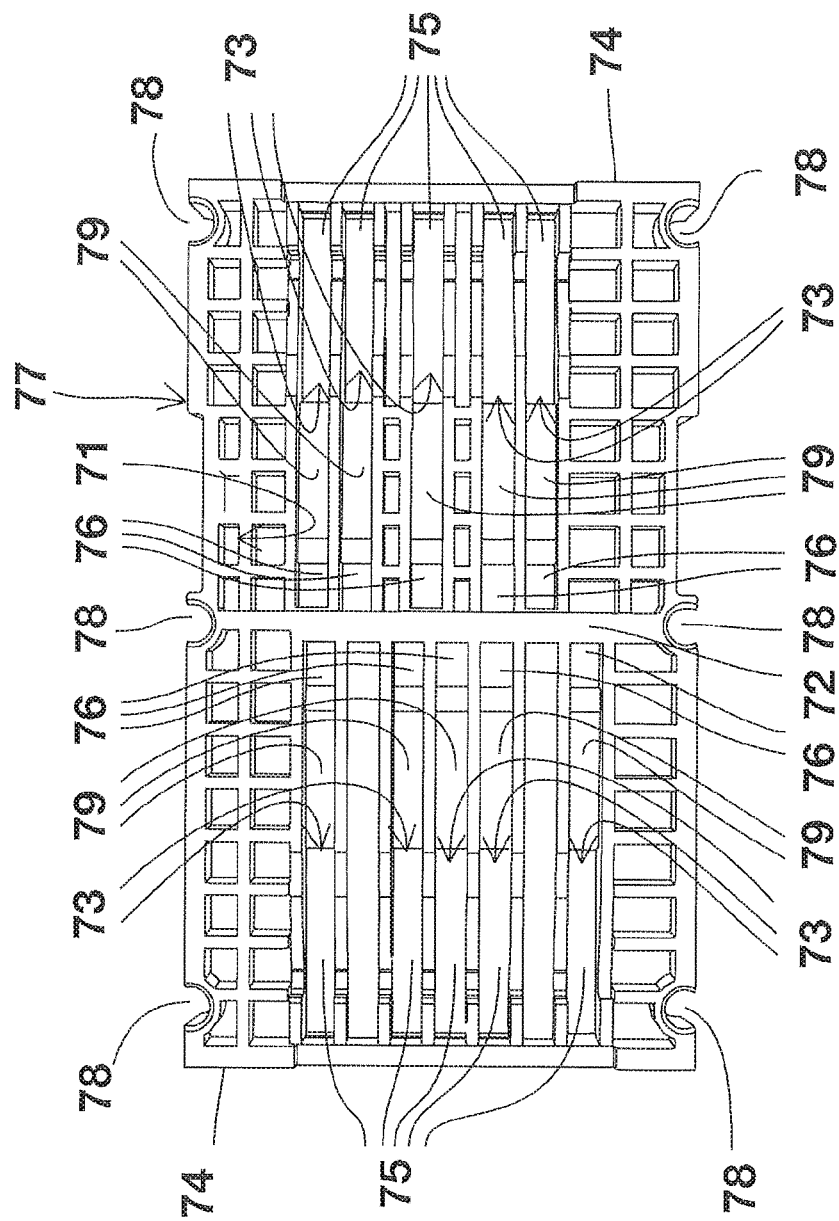
FIG. 6 is a plan view of a support for blade-holding arms of the device of FIG. 1.

The support 7, as shown in FIGS. 1 and 6, is in the form of a longitudinal plate equipped with a first face 70 generally flat and a second face 71 opposite the first and provided with a plurality of lanes 73 longitudinal and parallel to said axis X-X so as to accommodate said arms 8 to allow flexing orthogonally with respect to said axis X-X. In particular, a rib 72, preferably arched (better visible in FIG. 1), transversely divides the second face into two generally equal portions, each crossed by said plurality of longitudinal lanes 73 which extend from said rib 72 in the direction of respective transverse edges 74 of the support. Preferably, in proximity of said transverse edges 74, the lanes 73 have a through opening 75 to allow the passage of the heads of the arms 8, as explained below. In correspondence with the ribs 72, on the other hand, the lanes comprise a seat 76 for engaging the tails of the blade holder arms 8. Between the seats 76 and the openings 75 the lanes comprise an inclined plane 79 towards the openings themselves (shown in the sections of FIGS. 12-14).

The perimeter edge 77 is preferably shaped so as to create an orientation. Furthermore, it protrudes from the first face 70 (not shown) so as to engage the aforementioned corresponding channel 38 obtained on the second shell 3. Preferably, the perimeter edge 77 of the support 7 also comprises a plurality of recesses 78 suitable for at least partially receiving the seats 36 for the fixing screws 22 obtained on the bottom 30 of the second half-shell 3. In this way, a sort of centering of the support is achieved in the second half-shell 3.

Figure 7:
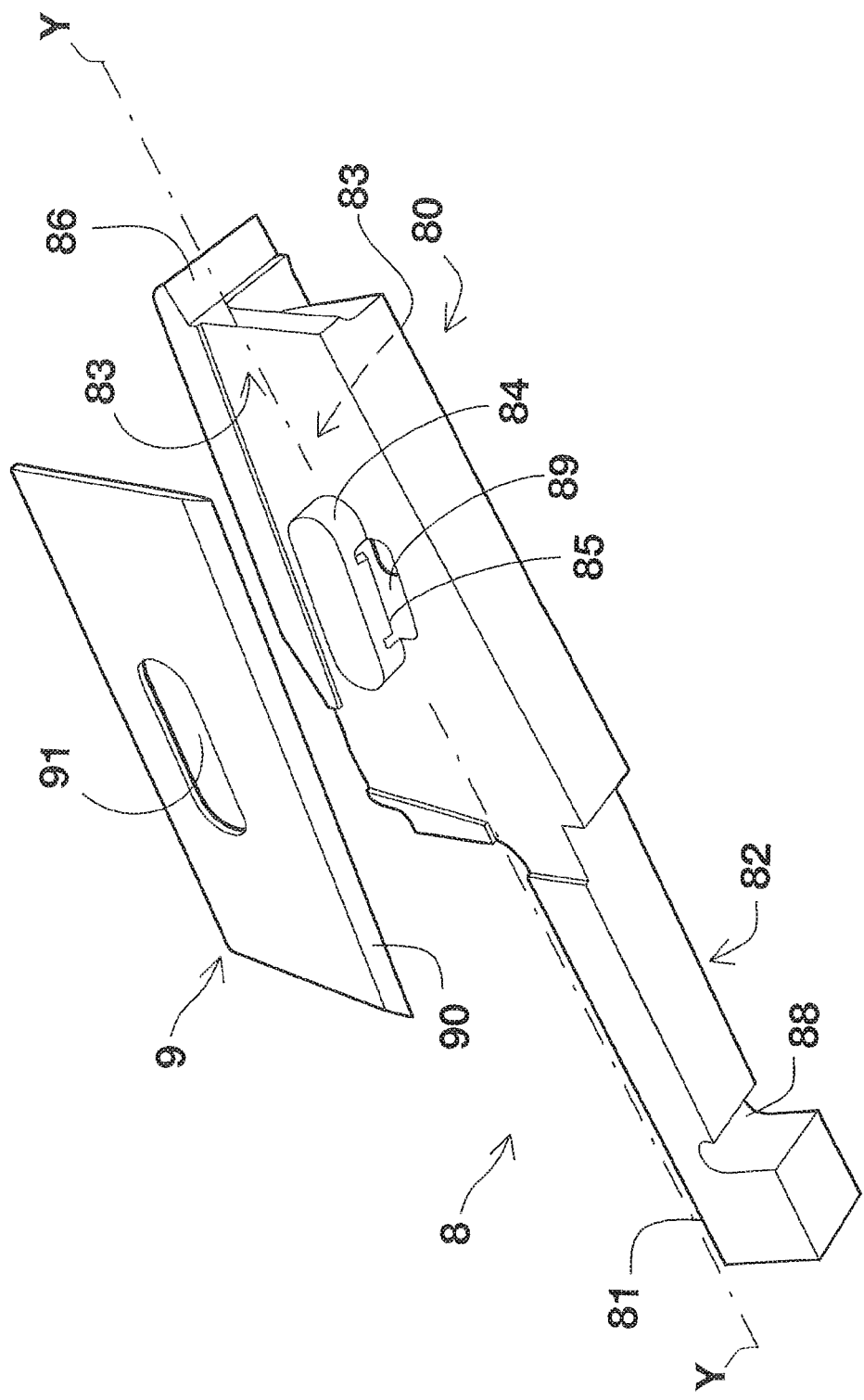
FIG. 7 is a perspective view from below of a blade-holding arm of the device of FIG. 1 with a respective blade released.
Figure 8:
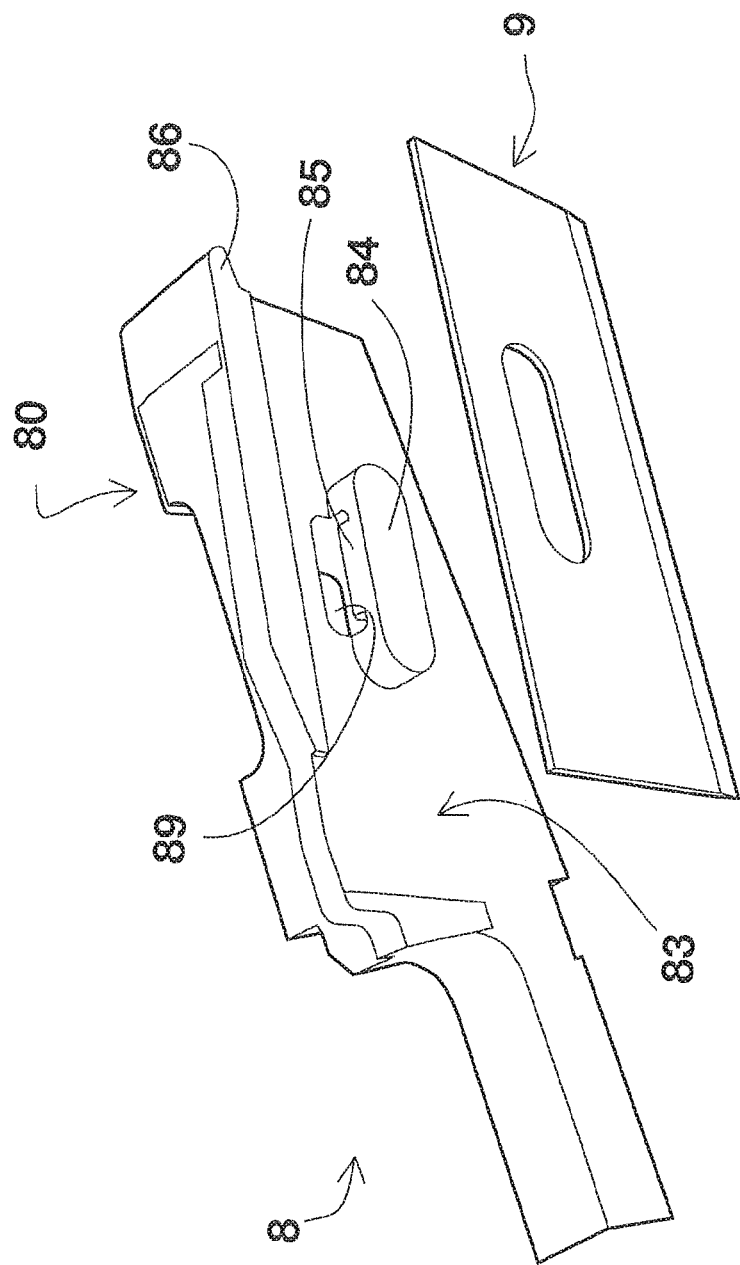
FIG. 8 is a top perspective view of an enlargement of the arm of FIG. 7 with a blade released.

With reference to FIG. 7, the blade 9 holder arm 8 comprises a head 80 movable orthogonally with respect to said axis X-X and joined to a tail 81 by means of a rectilinear portion 82, which portion is flexible so as to extend along a longitudinal axis Y-Y. In particular, the head 80 has two flat opposite side faces 83, at least one of which comprises a pin 84 for engagement with said blade. Preferably, said pin is internally hollow and its base is open on a window 89 of the lateral face 83. The edge of the base of the pin is then provided with two opposite flexible teeth 85 facing towards said window for the reversible retention of said blade, such as explained later. Preferably, the pin has an elongated and rectilinear shape slightly inclined with respect to the longitudinal axis Y-Y of the arm towards the free end of the head 80. This free end is then provided with a projection 86 able to abut on the transverse edge 74 of the support 7 as a safety limit switch, as explained below.

The tail 81 of the arm is connected to the flexible straight section 82 by means of a step 87 (FIG. 9) so as to create a thickening which engages the aforementioned seat 76 of the support 7.

In proximity to said step 87, the rectilinear portion 82 preferably comprises a groove 88 which constitutes a weakening to facilitate the bending of the portion itself.

The blade 9 (FIG. 7) is a sheet of general rectangular shape with a straight longer side 90 and worked flush to operate the cut and with an elongated slot 91 having a shape complementary to the pin 84 of the head 80 of the arm 8.

Figure 9:
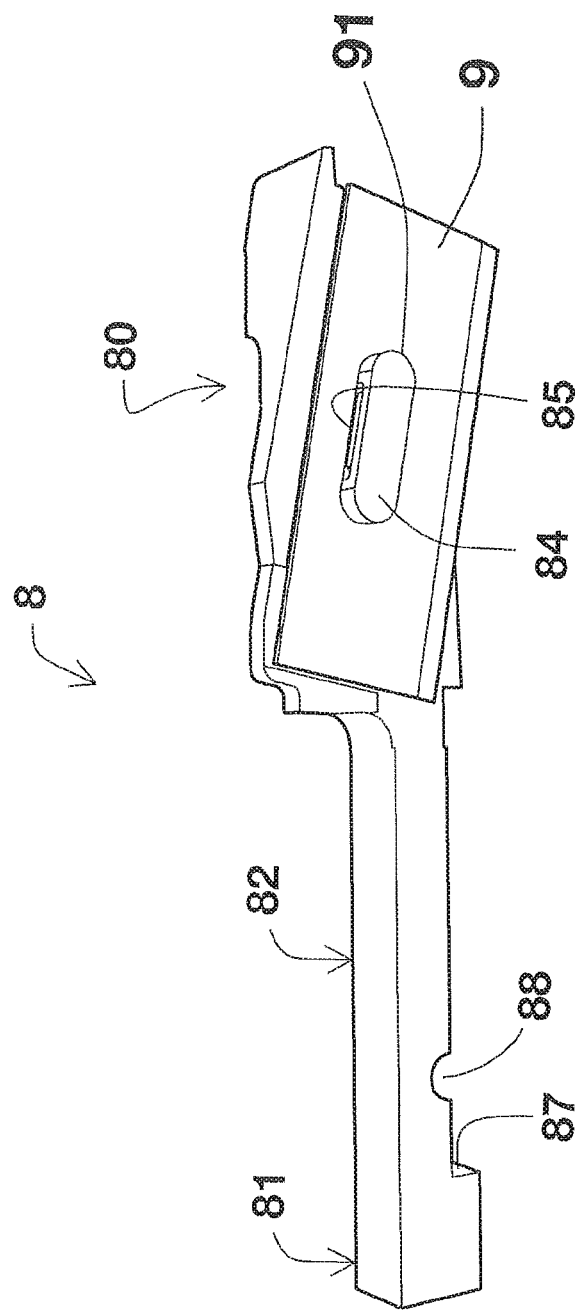
FIG. 9 is a top perspective view of the arm of FIG. 7 with the blade mounted.

As shown in FIG. 9, the blade 9 is mounted on the head 80 of the arm 8 by engaging the edge of the slot 91 of the blade with the two teeth 85 of the pin 84. This engagement is achieved with a click when said edge of the slot passes teeth 85. In this way, the blade is firmly fixed on the head with an inclination such that a part of the edge 90 of the blade 9 protrudes with respect to the profile of the head.

The device 1 of the invention, as described in its individual components, can be easily assembled. The arms 8, carrying the blades 9 mounted as explained above, are inserted into the respective lanes 73 so that the tail 81 of each engages a seat 76 of the support 7 and the head 80 is in correspondence with the opening 75. The support 7 thus prepared is placed on the second half-shell 3 so that its first face 70 rests on the grid structure formed by the longitudinal 34 and transverse 35 ribs of the bottom 30 of said second half-shell 30. Correct positioning is guaranteed by the correspondence of the blades 9 with the respective grooves 33 on the bottom 30 of the second shell 3 and between the seats 36 for the fixing screws 22 of the second shell and the recesses 78 of the perimeter edge 77 of the support 7. Everything is facilitated by the centering made between the channel 38 of the second half-shell 2 and edge 77.

At this point, the first half-shell 2 can be positioned to cover the support 7 by overlapping the first 11, second 12, third 13 and fourth 14 portions with the respective commands 10 and fingers 26 with the heads 80 of the arms 8.

The tightening of the two shells is ensured by the aforementioned interlocking elements on the respective contact edges (not shown) and/or by the aforementioned screws 22, which simultaneously engage the seats 36 and 27, respectively of the second 3 and first 2 half-shells. This tightening involves the contact between the aforementioned two ribs 27 of the internal face of the first half-shell 2 with the tails 81 of the arms 8 which are housed in their seats 76 of the support 7. Therefore, the arms are firmly constrained in their operating position.

It is noted that thus assembled the device 1 has the blades 9 inside it distributed parallel to each other along one or more lines orthogonal to the axis X-X of the device itself.

Figure 10:
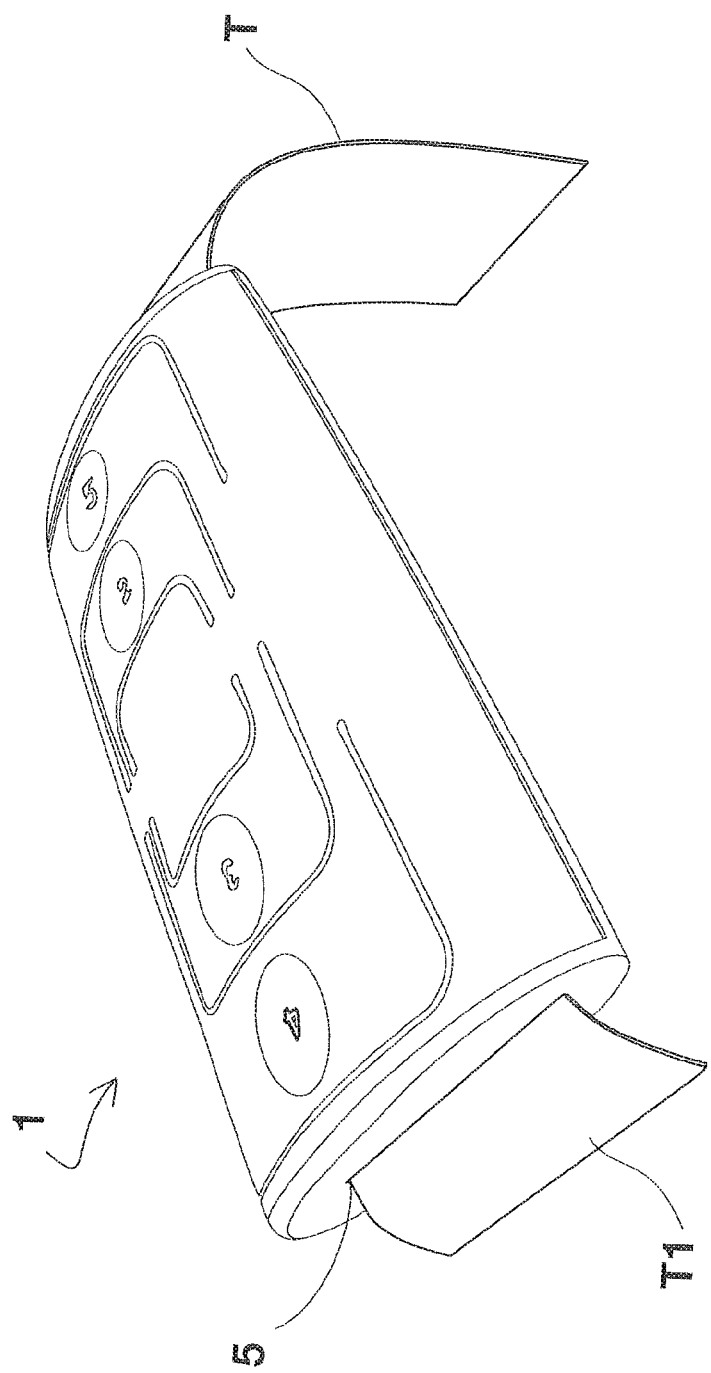
FIG. 10 is a top perspective view of the device of FIG. 2 in a first operating condition.
Figure 11:
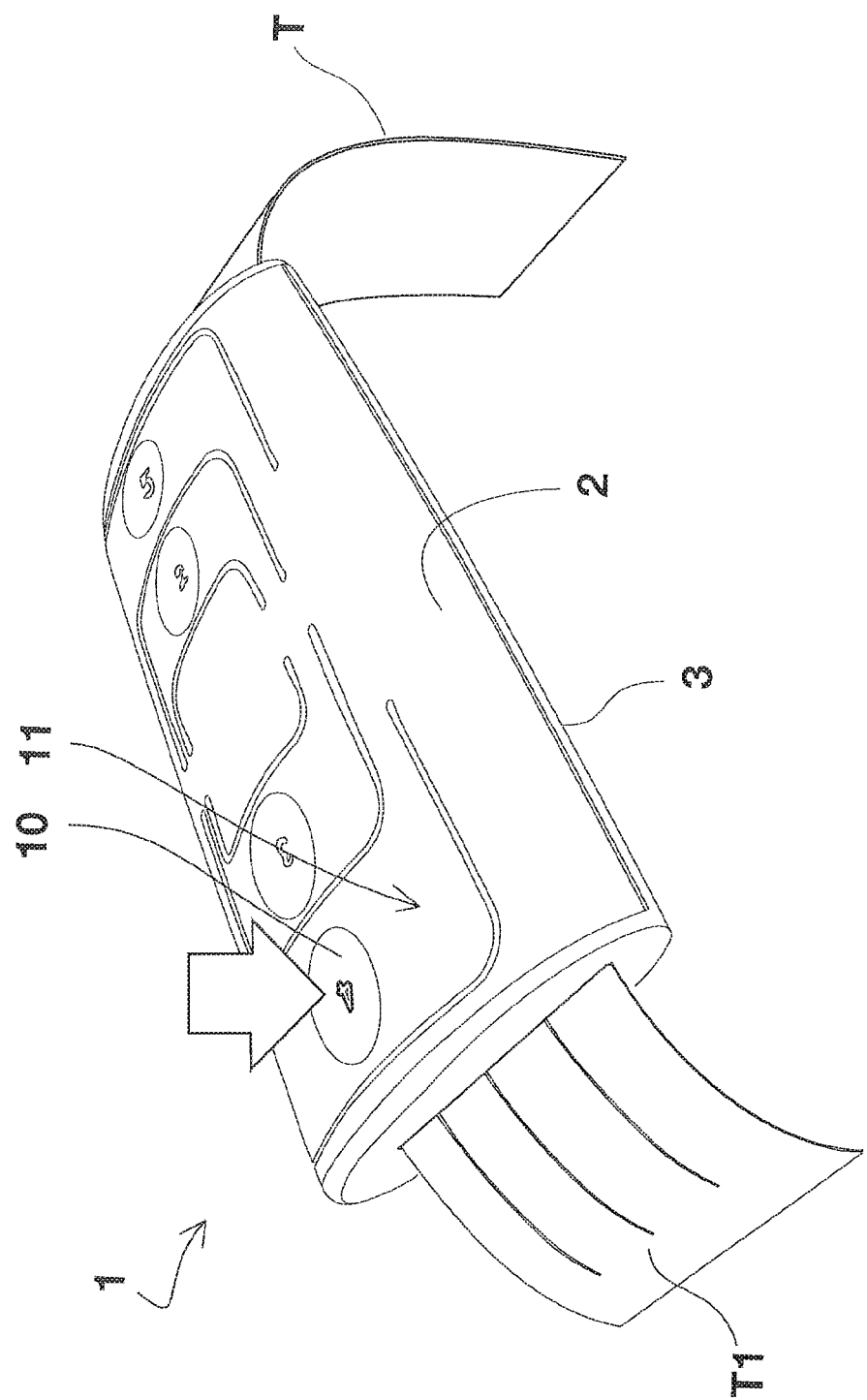
FIG. 11 is a top perspective view of the device of FIG. 2 in a second operating condition.

Now, a tape T can be inserted into the first 5 or second 6 opening depending on the desired number of strips. For example, as shown in FIG. 10, the ribbon is inserted into the second opening 6 (not shown) and made to slide until it comes out of the first opening 5. Then, as shown in FIG. 11, the command indicated with the reference number 4 is pressed and with the fingers of one hand take the end of the T1 tape that comes out of the first opening, pulling the tape outwards. In this case, four perfectly regular and cut strips of tape will be produced without any burrs or imperfections.

Figure 12:
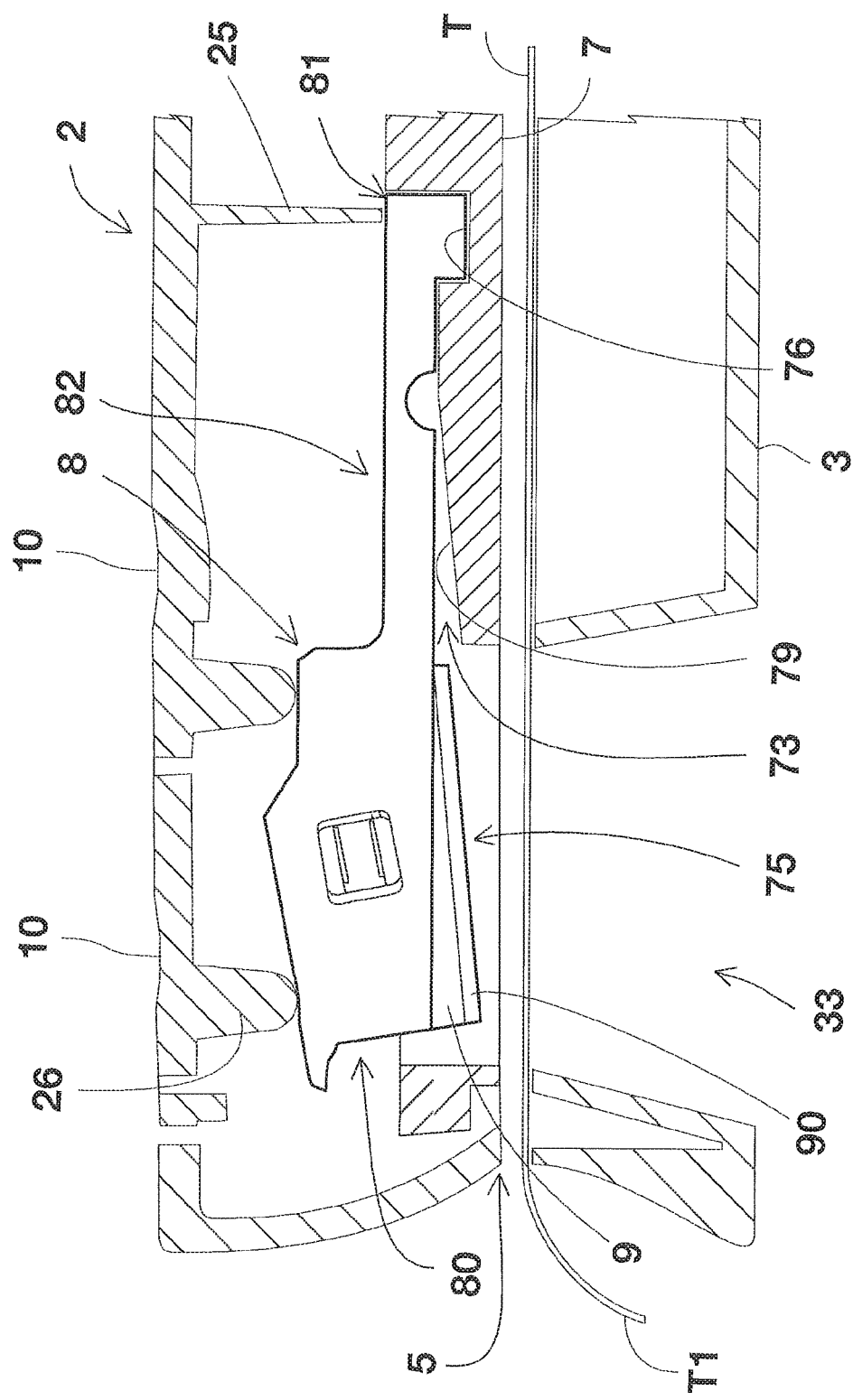
FIG. 12 is a partial sectional side view of the device of FIG. 1 in a rest condition of the arm of FIG. 9.

In particular, as shown in FIG. 12, before making the cut, the arms 8 carrying the blades 9 are housed in a respective lane 73 of the support 7. The tail 81 of the arm is inserted in the seat 76 of the lane 73, the section straight 82 is located above and detached from the inclined plane 79 at least for a good part, and the head 80 above the opening 75.

Figure 13:
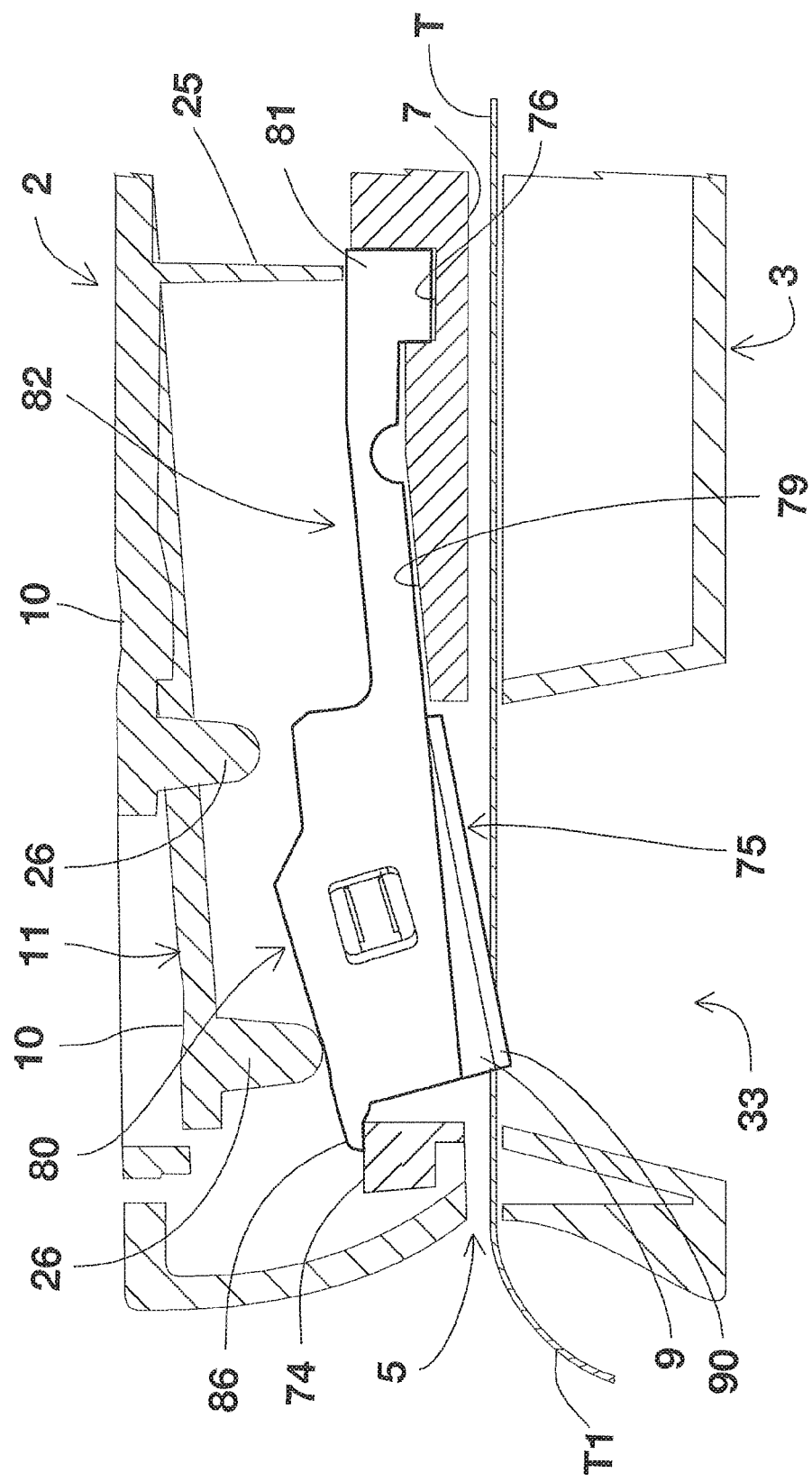
FIG. 13 is a partial sectional side view of the device of FIG. 1 with an arm activated by a first command.

If you want to activate the command identified for example with the reference number 4 in FIG. 11, the corresponding first portion 11 of the first half-shell 2, as shown in FIG. 13, is lowered inside the device and the corresponding finger 26 acts on a point of the head 80 of the arm flexing it in the opening 75 thanks to the bending of the straight section 82 of the arm 8. The movement continues until said straight section 82 abuts against the inclined plane 79 of the lane 73 and, at the same time, the projection 86 of the head 80 of the arm does not abut against the transverse edge 74 of the support 7. In this position a portion of the blade 9 protrudes with its edge 90 from said opening 75 and, at the same time, also engages the groove 33 of the second half-shell 3, moving thus cutting the tape T. It can be seen that this bending of the head 80 and of the straight section 82 is possible in absolute safety and efficacy even thanks to the sandwich bond created by a rib 25 of the first half-shell and by the seat 76 of the support 7 with the tail 81 of the arm in there between. Furthermore, the lanes 73 form precise guides, which do not allow lateral displacements with respect to the axis X-X.

Figure 14:
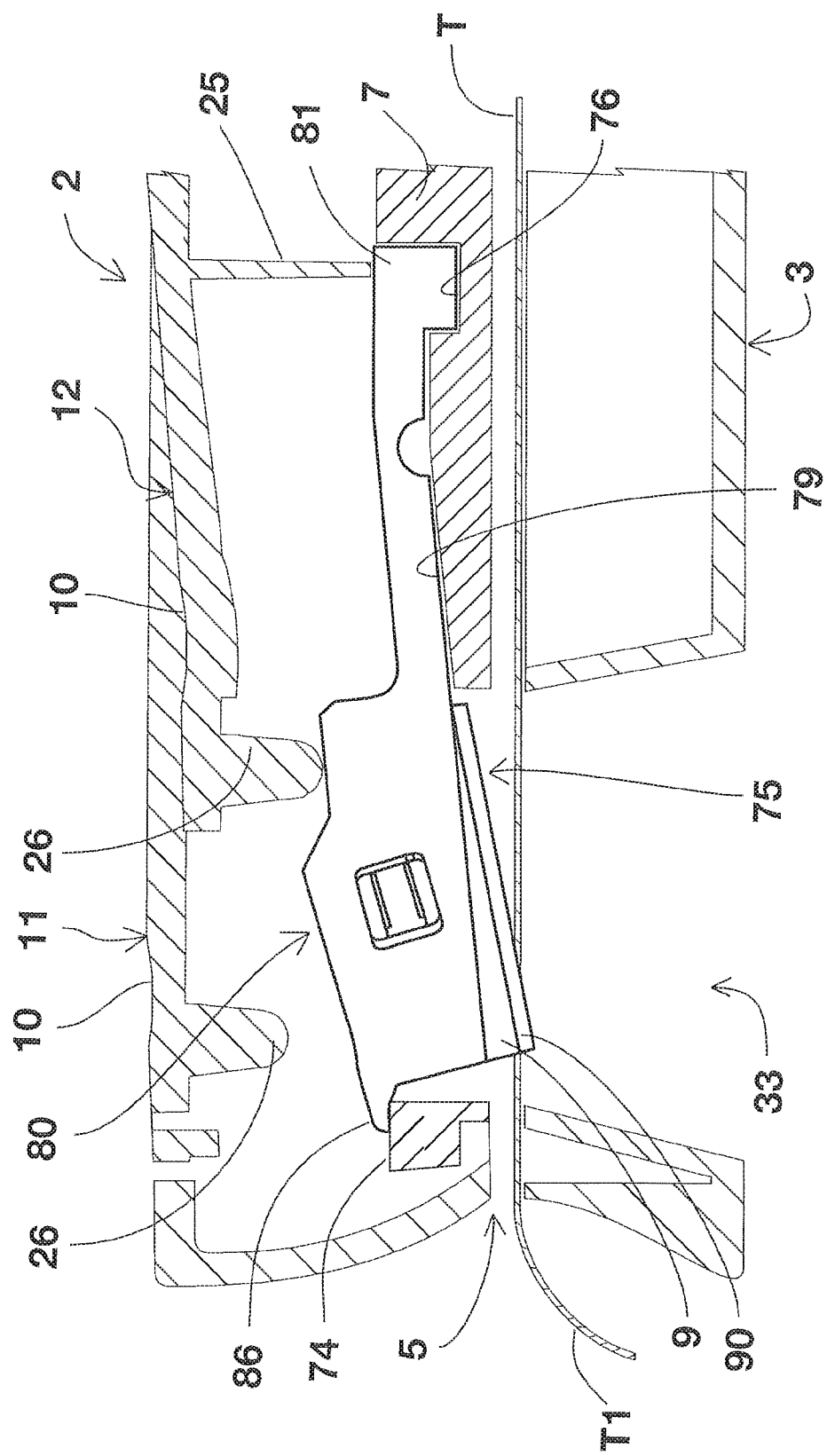
FIG. 14 is a partial sectional side view of the device of FIG. 1 with an arm of activated by a second command.

As shown in FIG. 14, if it is desired to obtain three strips from the tape T, by pressing the command 10 on the second portion 12 of the shell 2, the corresponding fingers 26 (only one is shown in FIG. 14) act on a different point of the head 80 of arms 8 different from those activated by the first portion, as described with reference to FIG. 13. This is made possible thanks to the different alignment of the arms and fingers in the two halves of the device. In other words, the blades 9 near each of the first 5 and second 6 openings are aligned transversely with respect to the longitudinal axis X-X of the device, while those near the first opening 5 are longitudinally misaligned with respect to those near the second opening 6. The corresponding fingers 26 for activating the blades 9 are, on the other hand, transversely aligned in each portion, first 11, second, 12, third 13 and fourth 14, but are transversely and longitudinally misaligned from portion to portion.

As regards the tapes that can be cut, there is no limit to the type, therefore any type of tape can be used with the device of the invention.

In particular, the present device is particularly advantageous for adhesive tapes which enclose a wide range of tapes resistant to mechanical stress. The various types can be distinguished according to the structure with reference to the support. For example, depending on the specific use, the reinforced tapes can have a support of paper, non-woven fabric, plastic or metal material. The plastic support is the most used thanks to its remarkable versatility for many different sectors. The most common plastic materials are polyester, polypropylene, polyethylene, polypropylene/polyethylene copolymer, polyvinyl chloride, polyimide, polyamide (Nylon), polytetrafluoroethylene, polyvinylalcohol, polyurethane, polyvinylfluoride, rubber such as neoprene or elastomers.

The supports are then preferably strengthened with a fabric preferably incorporated into the support. The fabric is made up of fibers of different natural or synthetic origin, such as cotton, jute, wood fibers, cellulose, acrylic fibers, polyester, polyethylene, nylon, microfibers and their combinations. The weft of the fibers can be random like the non-woven fabric obtained by hydro entangling of synthetic fibers or ordered weft with arrangement of the fibers longitudinally and/or orthogonally in one or more layers.

The glues that are used depend on the substrate on which the tapes are applied. Therefore, they can be rubbery resins, acrylic-based, silicone-based, preferably biocompatible glues if the tapes are of the elastic type for rehabilitation or physiotherapy.

From what has been described above it is now evident that the drawbacks of the known art previously mentioned have been solved.

In particular, it is no longer necessary to cut individual strips from time to time with scissors to adapt the standard-sized tapes to the required measurements. At the same time, large storage and relative packaging of tapes having different widths are avoided.

The need for an accurate cut is also completely avoided since with the device of the invention the cut takes place automatically, guided and therefore perfectly controlled.

The risk of accidental injuries due to the handling of scissors or cutters is eliminated because the blades are contained in an internal cavity of the device accessible only through openings designed to slide the tape itself.

The device is constructively simple and easy to operate. It follows that it requires practically no maintenance. Furthermore, thanks to the particular arrangement of the blades, their wear involves only a portion. Therefore, it is possible to mount them in the opposite direction in order to expose the non-worn part to have a sharp blade. This operation is incredibly facilitated by the fixing of the blades on the heads of the arms with a simple reversible snap joint. It is therefore evident that the costs of replacing the blades are drastically lowered thanks to the possibility of using only a portion of the blade edge and then turning it over, without, among other things, affecting the functionality of the cut. In fact, the cut takes place on a corner part of the blade, thus making the action very efficient.

The actuation mechanism is then simple and safe because it is based on the bending of arms received in corresponding and single dedicated lanes. Therefore, the wear is practically only of the blades, while the arms are prevented from breaking as there are the aforementioned limit switches for bending which avoid excessive effort.

Furthermore, the second half-shell 3 is perforated in correspondence with the grooves 33 where the blades 9 are received during the cutting action. Therefore, in addition to the guide function for the blades, the grooves allow any waste material or scraps of the cut tape to be discharged without causing clogging that could affect the operation of the device in the long run.

Further variants and modifications to the device of the invention can be adopted by those skilled in the art, however without departing from the scope of protection as defined by the attached claims.

For example, the shape of the device can vary according to particular needs or preferences, so as to assume ergonomic and/or pocket-sized shapes in order to optimize its practicality and speed of use, especially if required, for example, during the competition activity.

The device 1 of the invention can advantageously comprise a support (not shown) for a roll of tape (not shown), such as that described in the aforementioned patent EP3454799.

In accordance with a variant embodiment not shown, advantageously, the first half-shell 2 can comprise a first portion of a lateral seat adapted to cooperate with a corresponding second portion of the second half-shell 3 for receiving a knife, as described in the patent EP3454799.

The materials with which the various pieces are made are generally plastic, except for the blades. In fact, the blades are conventionally made of metallic materials, such as steel and relative alloys, suitable for guaranteeing durability of use and an excellent cutting edge.

The number and arrangement of the blade commands can vary according to specific needs or preferences, also in order to vary the possibility of cutting size. In particular, the arms 8 can guarantee ease of replacement and storage, avoiding expensive constructions which force the total replacement of the blade support 9.

It should be kept in mind that the tape can be made to slide from one opening to the other as identified in the present description or vice versa, taking into account the need to activate one or more blades simultaneously according to the desired number of cuts.

The invention claimed is:

1. Device for cutting tapes comprising:
a first half-shell and a second half-shell adapted to surround an inner cavity that houses a plurality of cutting blades, the inner cavity being provided with a first aperture and a second aperture opposite each other on a longitudinal axis of the device so as to allow sliding and cutting of a tape, wherein:
the first half-shell comprises a plurality of commands, each command being configured to activate one or more of the cutting blades, and
the second half-shell comprises a plurality of protrusions for supporting the tape and for guiding the cutting blades when the cutting blades are activated by the commands, and
a support fixable between the two half-shells and provided with a plurality of lanes for housing a plurality of flexible blade-holding arms, each lane housing one of the blade-holding arms and each blade-holding arm having a head provided with a one of the cutting blades.

2. Device according to claim 1, wherein the plurality of lanes extend longitudinally and parallel to the longitudinal axis and allow each blade-holding arm to flex about an axis that is orthogonal to the longitudinal axis.

3. Device according to claim 2, wherein:
the support includes two transversal edges,
a rib of the support transversally divides the support into two portions, each portion containing a subset of lanes among the plurality of lanes,
each lane starts from the rib and extends towards one of the transversal edges of the support,
each lane includes a through opening near one of the transversal edges to allow passage of one of the blades,
each lane includes a seat near the rib for engaging the arm, and
each lane includes a plane between one of the seats and one of the openings, the plane being inclined towards the one of the openings.

4. Device according to claim 1, wherein each arm further comprises a tail sandwiched between the first and second half-shells, and a rectilinear portion that joins the head with the tail.

5. Device according to claim 4, wherein the head of each arm has two side faces, and at least one of the side faces comprises a pin for engaging one of the cutting blades.

6. Device according to claim 5, wherein each pin is hollow and has a base that faces a window of the at least one side face, and a border of the base of the pin is provided with two teeth which are flexible, the teeth being on opposite sides of the pin from each other and facing the window and being configured to retain the one of the cutting blades.

7. Device according to claim 1, wherein the head of each blade-holding arm further comprises a protrusion configured to abut against a transversal edge of the support to stop flection of that blade-holding arm.

8. Device according to claim 1, wherein each command comprises a portion elastically bendable towards the inner cavity so as to selectively activate the one or more of the cutting blades by a corresponding finger.

9. Device according to claim 1, wherein an inner face of the first half-shell comprises two ribs that cross the longitudinal axis, the ribs maintaining the arms in an operative position.

10. Device according to claim 1, wherein the second half-shell has a bottom comprising a plurality of protrusions configured to support the tape at points at which the cutting blades cut the tape, each protrusion including a hole that receives a tip of one of the cutting blades during cutting.

11. Device according to claim 1, wherein each lane partially surrounds one of the blade-holding arms on three sides of the one of the blade-holding arms.

12. Device according to claim 1, wherein a longest dimension of each blade-holding arm is parallel to the longitudinal axis of the device.

13. Device according to claim 1, wherein each blade-holding arm further comprises a tail, wherein the head flexes relative to the tail.

* * * * *